United States Patent Office 2,770,799
Patented Nov. 13, 1956

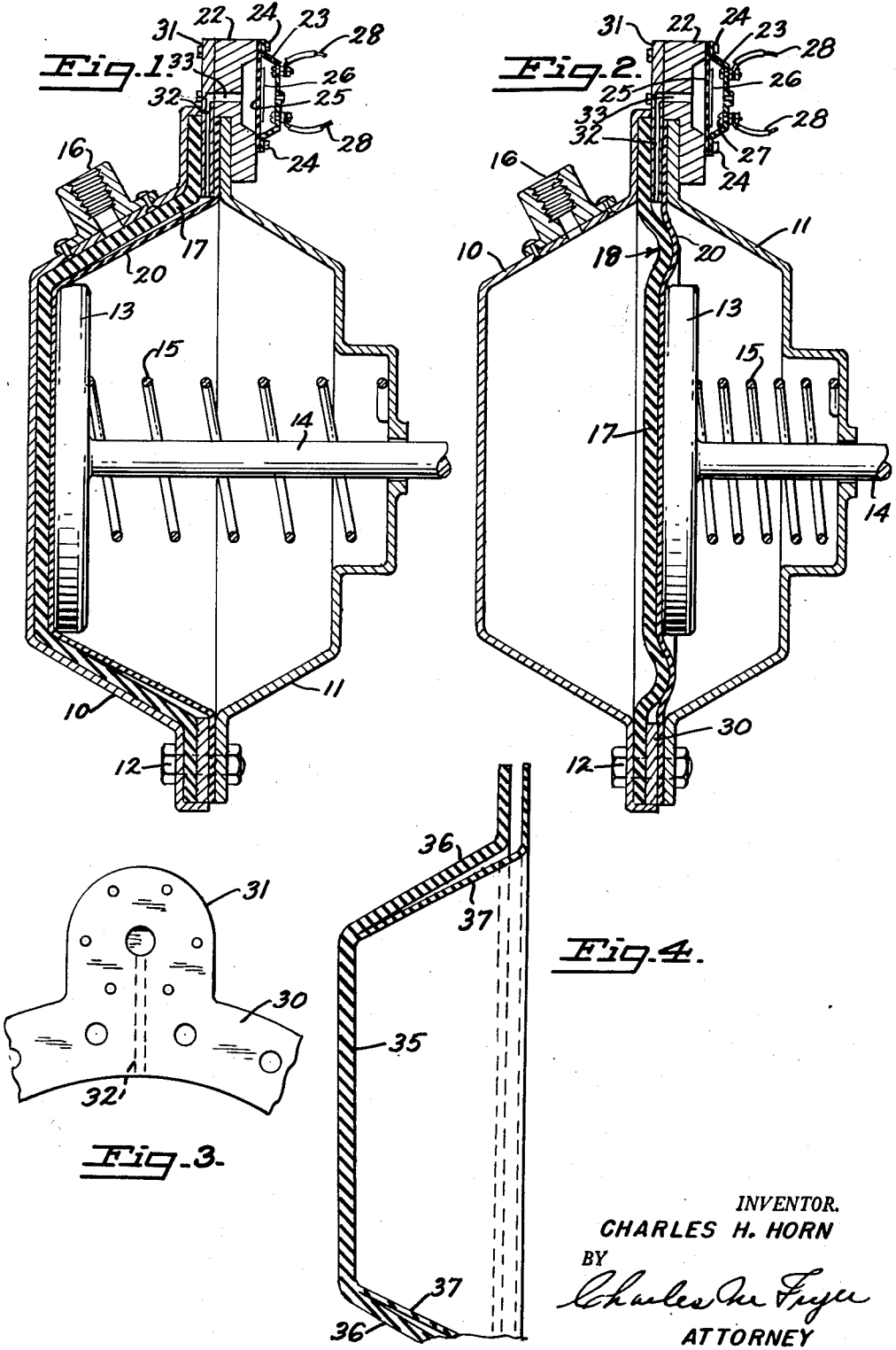
Nov. 13, 1956     C. H. HORN     2,770,799
EMERGENCY DIAPHRAGM FOR AIR BRAKES AND THE LIKE
Filed July 24, 1953
INVENTOR.
CHARLES H. HORN
BY
ATTORNEY

2,770,799

EMERGENCY DIAPHRAGM FOR AIR BRAKES AND THE LIKE

Charles H. Horn, Downey, Calif.

Application July 24, 1953, Serial No. 370,185

6 Claims. (Cl. 340—242)

This invention relates to fluid actuated rams or cylinders which employ a flexible diaphragm as an operating part and relates particularly to means operable upon the failure of such a diaphragm to prevent loss of fluid pressure in the system and to actuate a signal to indicate the fact that failure has occurred.

The invention is best disclosed by reference to a conventional air brake system such as used on trucks, trailers and other vehicles but it is readily adaptable to many other applications as will become apparent upon an understanding of the manner in which it functions.

It is an object of this invention to provide a safety device for use in conjunction with a fluid actuated diaphragm assembly to prevent loss of fluid pressure in the event of failure of the diaphragm or of any diaphragm included in a multiple diaphragm system.

Another object of the invention is to provide such a safety device with means to visibly or audibly indicate the event of failure.

Still further and more specific objects and advantages of the invention and the manner in which it is carried into practice are made apparent in the following specification by reference to the accompanying drawings wherein one form of the invention is shown and described in detail.

In the drawings:

Fig. 1 is a central vertical sectional view through a conventional brake actuating cylinder illustrating the application of the present invention thereto, Fig. 2 is a similar view of the same cylinder illustrating the parts therein in the positions assumed when the brakes are applied or partially applied, Fig. 3 is a fragmentary detail in elevation of a portion of a spacer member shown in Figs. 1 and 2, and Fig. 4 is a view in central vertical section of a modification of the diaphragm structure illustrated in Figs. 1 and 2.

Figs. 1 and 2 show a conventional pneumatic brake actuating cylinder of the kind employed on trucks and the like. This cylinder comprises a pair of separable casing parts 10 and 11 secured together at their flanged edges as by bolts shown at 12. A flat piston 13 is disposed inside the cylinder and is connected as by a rod 14 with a brake mechanism which is not shown because it is conventional and unnecessary to an understanding of the present invention. A spring 15 surrounds the connecting rod 14 and acts between the casing part 11 and piston 13 to urge the piston toward the left as illustrated in the drawing and consequently to hold the brake in its released position.

The piston 13 is urged toward the right to apply the brake by fluid such as air under pressure which is admitted to the cylinder as through an inlet 16. A resilient diaphragm 17 of circular shape is clamped between the flanges of the casing parts 10 and 11 at its marginal edge and lies behind the piston 13. When air under pressure is admitted through the inlet 16 as by opening of a control valve actuated by the brake pedal of the vehicle, the diaphragm 17 is urged toward the right, as illustrated in Fig. 2, to move the piston and connecting rod 14 in a brake applying direction.

The structure so far described is entirely conventional and has the disadvantage that the diaphragm 17 which must be of relatively stiff and durable construction is susceptible to cracking or breaking due to repeated flexing actions. The failure of this diaphragm usually takes place at a position intermediate its secured marginal edge and the outer periphery of the piston 13, as for example at the point indicated by arrow 18 in Fig. 2.

A vehicle is usually provided with such a brake cylinder for each of several wheels and a single source of air under pressure is employed for actuating all of the brakes simultaneously. Consequently upon fracture of any one of the diaphragms 17, air escapes through the diaphragm and through the casing part 11 to the atmosphere. The casing part 11 is here illustrated as vented to enable the ordinary operation of the piston and diaphragm by enlargement of the opening through which the connecting rod 14 passes. Because of the fact that fracture of a single diaphragm results in loss of air pressure to actuate all of the brakes, an extremely dangerous condition exists and it is, therefore, customary for truck operators to renew the diaphrams in all brake cylinders at frequent intervals in order to guard against failure of any diaphragm under critically dangerous conditions.

The present invention serves to prevent the escape of air from the system upon the failure of one or more diaphragms so that the other brakes of the vehicle will continue to operate and it also provides means for indicating to the driver of the vehicle that a failure has taken place so that he might, at the first convenient moment, replace the broken diaphragm or all of the diaphragms if desired. This is accomplished as shown in Figs. 1 and 2 by the provision of an auxiliary diaphragm 20 disposed between the main diaphragm 17 and the piston 13 and also securely clamped at its peripheral edge between the flanges of the casing parts 10 and 11. This resilient diaphragm is made of highly resilient rubber-like material lacking the structural strength of the heavier diaphragm 17 necessary to actuate the piston 13 but capable of flexing more readily and more frequently without danger of becoming cracked or broken.

In normal operation and while the diaphragm 17 remains unbroken and impervious to air, the auxiliary diaphragm 20 follows the action of the main diaphragm and the piston 13 without performing any apparent function and without interfering in any manner with the normal action of the pneumatically actuated brake cylinder herein disclosed. The approximate position of the diaphragm 20 during a normal application of the brake being illustrated in Fig. 2 of the drawing. Assuming however that the diaphragm 17 has failed in the manner which would permit the escape of air under pressure, the presence of the more flexible diaphragm 20 prevents the escape of this air to the atmosphere as the diaphragm is resilient and sufficiently strong to retain the escaping air entirely within the confines of the casing part 11. Thus air from the system is not exhausted and all of the brakes which still retain an unruptured diaphragm will continue to operate until such time as suitable repairs can be made.

In order to advise the driver of the vehicle that one of the brake diaphragms has failed, the pressure of air which exists between the main diaphragm 17 and the auxiliary diaphragm 20, and which exists there only upon failure of the main diaphragm, is utilized to actuate a signal or warning device. In the present instance this device may be considered as a warning light or bell positioned in the driver's cab and energized through an electric switch of a kind which may be closed by pneumatic pressure. The particular type of electric signaling device employed does not constitute a part of the present invention but the switch and means for closing it are illustrated in Figs. 1 and 2. In these figures, a pneumatic switch is illustrated as having a casing part 22 and a casing part 23 secured together as by screws 24 and providing an internal chamber in which an imperforate diaphragm 25 is disposed. The diaphragm 25 carries a metal plate 26 and upon admission of air under pressure to the left hand chamber behind the diaphragm 25, the diaphragm is distended or displaced toward the right until the plate 26 bridges a pair of contact screws 27 to complete a circuit through wires 28. This circuit includes the signaling device. In order to supply air to the switch casing, a gasket or spacing member illustrated at 30 is interposed between the diaphragms 17 and 20 and is coextensive with their marginal edges clamped between the flanges of the casing parts 10 and 11. This gasket, as shown in Fig. 3 has a marginal projection 31 extending beyond the edges of the casing parts 10 and 11 and the housing part 22 of the pneumatic switch is screwed or otherwise suitably secured to this extending part. Air to the diaphragm chamber of the pneumatic switch is admitted through a channel 32 in the part 30 which communicates with a bore 33 in the switch housing part 22.

As a result of the structure disclosed, any failure of one of the diaphragms 17 permits air under pressure to enter the space between the diaphragm 17 and the diaphragm 20 and this air under pressure is communicated through the channel 32 with the diaphragm chamber of the pneumatic switch to close the switch and initiate the operation of the warning device. The warning device, as previously stated, may be a signal light or bell and there may be one such device for each brake so that the operator can readily identify the position at which failure has taken place. On the other hand, if desired, all of the pneumatic switches may be connected with a single circuit to operate a single warning device simply indicating that there has been a failure of one of the several brake actuating diaphragms on the vehicle.

A modified form of a diaphragm is shown in Figs. 4 of the drawing wherein the diaphragms 17 and 20 of Fig. 1 are molded as a single part separated only toward its outer edges or beyond the peripheral edge of the piston 13. In this construction, that portion of the diaphragm which bears against the piston is shown at 35 while the remainder or outer area of the diaphragm is divided into a heavy and more durable actuating diaphragm 36 and a lighter and more flexible safety diaphragm 37. This construction may be desirable to insure against wear of either or both of the diaphragm parts which might result from friction caused by slight relative movement of the diaphragm parts where they bear against the head of the piston 13.

I claim:

1. In a fluid pressure actuated system for brakes or the like wherein force is exerted through a flexible diaphragm, an auxiliary diaphragm adjacent the first diaphragm arranged to entrap fluid under pressure upon failure of the first diaphragm.

2. In a fluid pressure actuated system for brakes or the like wherein force is exerted through a flexible diaphragm, an auxiliary diaphragm adjacent the first diaphragm arranged to entrap fluid under pressure upon failure of the first diaphragm and means actuated by the pressure of said entrapped fluid to effect operation of a warning device.

3. In combination with a cylinder having a diaphragm therein and a piston bearing on one side of the diaphragm whereby the piston will be actuated upon introduction of fluid under pressure into the cylinder at the other side of the diaphragm, an auxiliary diaphragm interposed between the piston and the first diaphragm to entrap fluid under pressure in the event of failure of the first diaphragm.

4. In combination with a cylinder having a diaphragm therein, a piston disposed in opposition to one side of the diaphragm whereby the piston will be actuated upon introduction of fluid under pressure into the cylinder at the other side of the diaphragm, an auxiliary diaphragm interposed between the piston and the first diaphragm to entrap fluid under pressure in the event of failure of the first diaphragm and an electric switch actuated by pressure of fluid between the diaphragm to energize a warning device.

5. In combination with a cylinder having a diaphragm therein, a piston disposed in opposition to one side of the diaphragm whereby the piston will be actuated upon introduction of fluid under pressure into the cylinder at the other side of the diaphragm, an auxiliary diaphragm interposed between the piston and the first diaphragm to entrap fluid under pressure in the event of failure of the first diaphragm, a pressure actuated warning system and means for conducting pressure of said entrapped fluid to said warning system.

6. In combination with a cylinder having a diaphragm therein, a piston disposed in opposition to one side of the diaphragm whereby the piston will be actuated upon introduction of fluid under pressure into the cylinder at the other side of the diaphragm, an auxiliary diaphragm interposed between the piston and the first diaphragm to entrap fluid under pressure in the event of failure of the first diaphragm, an annular spacing element interposed between the marginal edges of the two diaphragms, a fluid passage extending radially through said spacing element, and an electric switch with a pressure chamber communicating with said passage and actuated by pressure between the diaphragms to energize a warning device.

References Cited in the file of this patent

UNITED STATES PATENTS

| | | |
|---|---|---|
| 337,116 | Bauman | Mar. 2, 1886 |
| 1,022,865 | Nicolai | Apr. 9, 1912 |
| 1,385,058 | Warter | July 19, 1921 |
| 1,528,074 | Ralston | Mar. 3, 1925 |
| 1,962,168 | Andrus | June 12, 1934 |
| 2,323,950 | Wade | July 13, 1943 |
| 2,495,081 | Thomas | Jan. 17, 1950 |
| 2,691,773 | Lichtenberger | Oct. 12, 1954 |